United States Patent [19]

Mukherjee

[11] Patent Number: 5,012,860

[45] Date of Patent: May 7, 1991

[54] ACTIVELY COOLED HEAT PROTECTIVE SHIELD

[75] Inventor: Samar B. Mukherjee, Munich, Fed. Rep. of Germany

[73] Assignee: Max-Planck-Gesellschaft zur Foerderung der Wissenschaften e.V., Goettingen, Fed. Rep. of Germany

[21] Appl. No.: 391,159

[22] Filed: Aug. 7, 1989

[30] Foreign Application Priority Data

Aug. 25, 1988 [DE] Fed. Rep. of Germany ....... 3828902

[51] Int. Cl.$^5$ .................. F16L 59/00; G21C 11/08
[52] U.S. Cl. ..................... 165/47; 165/168; 165/169; 122/6 R; 376/136; 376/150; 376/289
[58] Field of Search .......... 165/47, 168, 169; 122/6 R; 376/289, 150, 136

[56] References Cited

U.S. PATENT DOCUMENTS

| | | | |
|---|---|---|---|
| 1,607,743 | 11/1926 | Lulofs | 122/6 A |
| 1,775,414 | 9/1930 | Tone | 122/6 A |
| 1,912,912 | 6/1933 | Nygaard | 122/6 A |
| 1,944,569 | 1/1934 | Nygaard | 122/6 A |
| 2,059,766 | 11/1936 | Barker | 122/6 A |
| 2,190,271 | 2/1940 | Powell | 122/6 A |
| 2,290,014 | 7/1942 | Bennis | 122/6 A |
| 3,979,866 | 9/1976 | Prescott | 376/289 |
| 4,235,279 | 11/1980 | Feuchter et al. | 164/443 |
| 4,690,793 | 9/1987 | Hitachi et al. | 376/150 |
| 4,696,781 | 9/1987 | Bourque | 376/150 |

FOREIGN PATENT DOCUMENTS

| | | | |
|---|---|---|---|
| 7813433 | 10/1978 | Fed. Rep. of Germany . | |
| 3416843 | 11/1985 | Fed. Rep. of Germany . | |
| 34777 | 12/1959 | Finland | 122/6 A |
| 1272360 | 11/1986 | U.S.S.R. | 376/289 |
| 304673 | 1/1929 | United Kingdom | 122/6 A |
| 1080897 | 8/1967 | United Kingdom | 122/6 A |
| 1246442 | 9/1971 | United Kingdom | 122/6 A |

Primary Examiner—John Ford
Attorney, Agent, or Firm—Brumbaugh, Graves, Donohue & Raymond

[57] ABSTRACT

In a heat protective shield with solid protective element bodies (16), which consist of highly heat-resistant material such as graphite, each containing a groove-like recess (20), and comprising cooling pipes (12) arranged in the recess (20), the wall portion forming the recess (20) surrounds the respective cooling pipe (12) in tongs-like manner and the protective element bodies (16) are connected to the associated cooling pipe solely in radially form-locking and axially force-locking manner.

9 Claims, 1 Drawing Sheet

ACTIVELY COOLED HEAT PROTECTIVE SHIELD

BACKGROUND OF THE INVENTION

1. Field of the Invention

The invention relates to an actively cooled heat protective shield having cooling pipes which are connectable to a coolant system, and protective element bodies which consists of refractory material. Each protective element body has a groove-like recess for receiving a cooling pipe.

2. Description of the Related Art

In a heat protective shield known from German patent application 3,416,843 as laid open to inspection the cooling pipes are brazed into the groove-like recesses of the protective element body which can consist of graphite.

U.S. Pat. No. 4,235,279 discloses a continuous casting mold for metals which consists of a graphite block of which the outer surface comprises grooves for receiving cooling pipes. The grooves have semicircular cross-section. The cooling pipes are pressed yieldably into the grooves.

SUMMARY OF THE INVENTION

It is an object of the invention to provide a heat protective shield of the aforementioned type which is simpler and cheaper to produce, permits easier replacement of damaged protective element bodies and is better able to withstand thermal alternating stresses.

An actively cooled heat protective shield according to an embodiment of the invention includes cooling pipes and protective element bodies which consist of refractory material. Each protective element body contains a groove-like recess for receiving a cooling pipe. According to the invention the wall portion forming the recess surrounds the respective cooling pipe in a peripheral region of more than 180 degrees and less than 360 degrees in tong-like manner and the protective element bodies are secured in the radial direction of the associated pipe in form-locking manner, and in the longitudinal direction of the associated pipe in force-locking (frictional) manner to the associated cooling pipe.

In a preferred embodiment the wall portion forming the recess surrounds the associated cooling pipe in an angular range of 210 to 300 degrees, in particular about 270 degrees.

The heat protective shield according to the invention can be made simply and economically. Damaged protective element bodies can easily be replaced because they can simply be pushed onto the cooling pipes. The tong-like surrounding of the cooling pipe by the relatively massive generally prismatic body results in a firmer contact between the cooling pipe and the body on heating of the side of the body remote from the cooling pipe ("clamping effect") but on the other hand the cooling pipe and protective element bodies can slide with respect to each other in the longitudinal direction of the cooling pipe so that on temperature changes no appreciable axial stresses can occur. The positive form locking with the cooling pipe further effects a mechanical relieving of the critical zone of the protective element body adjoining the recess containing the cooling pipe. This is particularly advantageous when the protective element bodies consist in preferred manner of graphite because the graphite in the present heat protective shield is subjected primarily to compressive loads but only to reduced tensile loads, which it is less able to withstand.

BRIEF DESCRIPTION OF THE DRAWINGS

Hereinafter a preferred example of embodiment of the invention will be explained in detail with reference to the drawings, wherein.

DESCRIPTION OF THE PREFERRED EMBODIMENT

The heat protective shield according to the invention is useful in particular for plasma-physical apparatuses, such as fusion reactors and the like, and will therefore be described with reference to this preferred field of use.

Figure 1:
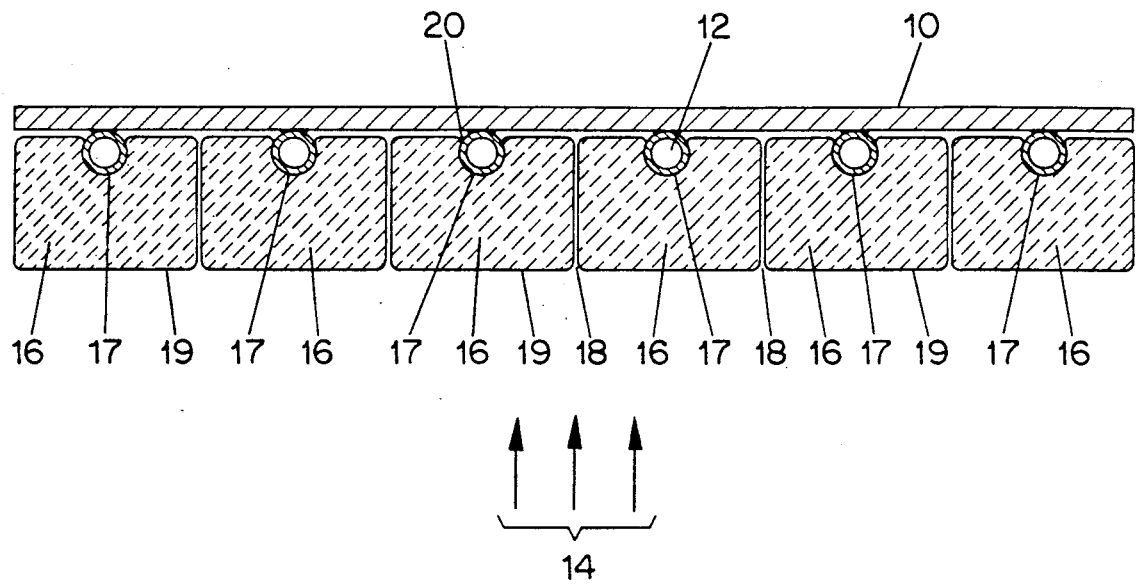
FIG. 1 shows a cross-sectional view of a wall to be protected which is provided with a heat protective shield according to a preferred embodiment of the invention.

FIG. 1 shows a wall 10 which is to be protected from excessive action of heat and which for example can form the so-called first wall of a fusion reactor or the inner wall of the vacuum vessel of a fusion experiment or a support structure of a limiter. Said protective system can also serve as heat collector. A plurality of cooling pipes 12 of metal (e.g. steel or copper) extending in spaced parallel relationship to each other are hard soldered or brazed or welded onto the wall 10. This connection occupies an angular region of about 90° on the side of the cooling tube 12 which is remote from the direction of a heat flow 14 to be kept away from the wall 10. The heat flow may for example originate from a plasma discharge, not illustrated.

On each cooling pipe 12 a plurality of protective element bodies 16 of graphite are arranged in axially force-locking (frictional) and radially form-locking (positive) manner; they may bear on each other or each be separated by an intermediate space. Between the bodies 16 which are arranged on two adjacent cooling pipes 12 a gap-like intermediate space 18 is provided.

The bodies 16 have on their side facing the heat flow 14 an exposed surface 19 which in the example of embodiment of the invention illustrated is substantially square, and on the side remote from the heat flow each has a recess 20, the wall of which closely surrounds the associated cooling pipe in a peripheral region of about 270 degrees. The bodies 16 are only pushed onto the associated cooling pipe 12, i.e. connected only in radially form-locking and axially force-locking manner to the cooling pipe, i.e. they form with the cooling pipe a positive sliding seat with frictional engagement.

Expediently, depending on the optimization, the thickness of the protective element bodies from the centre of the recess to the surface 19 may be considerably greater than the diameter of the recess, for example at least twice as great. The protective element bodies are expediently relatively massive, i.e. their smallest cross-sectional dimension can, depending on the optimization, be several times the, diameter of the cooling pipes.

Between the wall of the recess 20 and the cooling pipe 12 an intermediate layer 17 of carbon fibre paper of good thermal conductivity is arranged. This enables the heat resistance to be further reduced and provides a tolerance compensation between the recess 20 and the cooling pipe 12.

When in operation the surface 19 of the bodies facing the heat flow 14 is heated up the part of the body remote from the cooling pipes 12 expands somewhat so that the tongs-like clamping force between the body and the associated cooling pipe becomes stronger and the heat resistance at the transition between the body 16 and cooling pipe 12 is correspondingly reduced. Shearing stresses in the graphite, which can occur with a brazed connection between the cooling pipes and the protective element bodies, are avoided here because the protective element 16 can slide relatively unrestricted on the cooling pipe 12.

Figure 2:
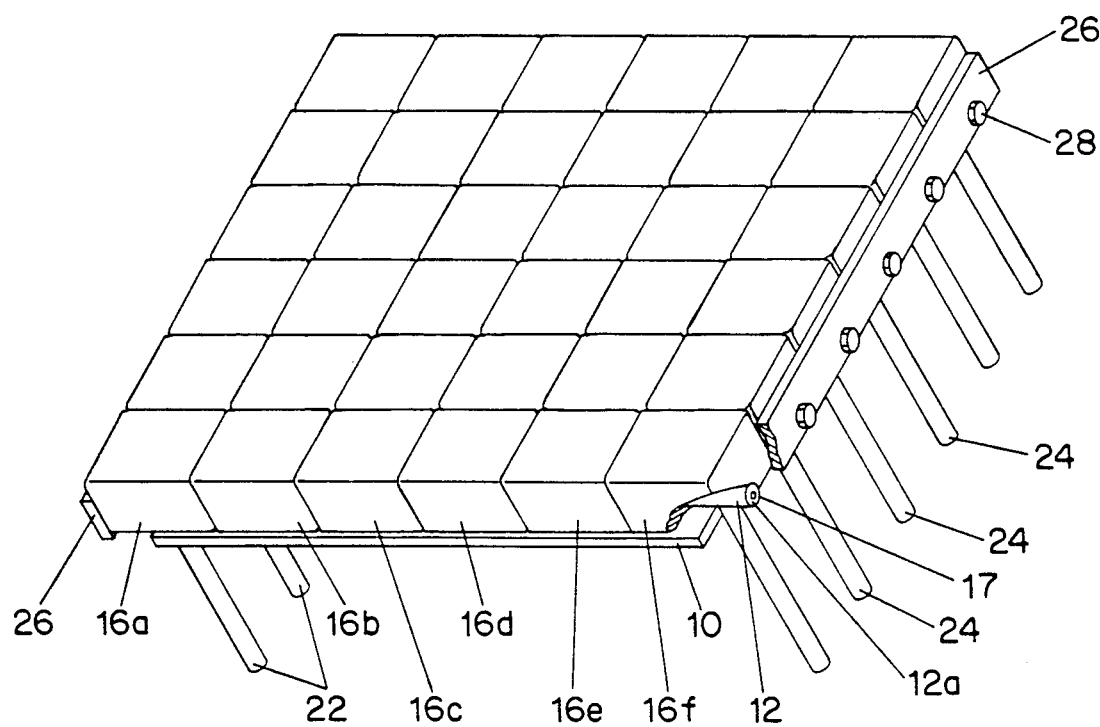
FIG. 2 is an isometric representation of the wall provided with the heat protective shield according to the invention.

FIG. 2 shows for example how a large-area cover can be made up. Cooling pipes 12 . . . are again brazed or welded onto the wall 10 to be protected. The cooling pipes 12 are in each case connected just before their ends to an inlet pipe 22 and an outlet pipe 24, which are in turn connected in operation to a coolant system, which is not shown. In this example six parallelepipedic graphite bodies 16a to 16f, square in plan view, are pushed in force-locking and form-locking manner onto each cooling pipe. The ends 12a of the cooling pipes projecting beyond the inlet and outlet pipes 22, 24 are provided with an internal thread so that on said pipes end plates 26 can be secured by threaded bolts 28 which seal the ends of the cooling pipes and fix the protective element bodies 16 in the axial direction with a certain play on the associated cooling pipes. In the peripheral direction of the cooling pipes the position of the protective element bodies can be fixed by springs (not shown) attached to the wall 10.

The example of embodiment described above can be modified in a great number of ways without leaving the scope of the invention. On a cooling pipe or cooling pipe portion only a single correspondingly long cooling element body may be provided. The peripheral region in which the wall of the recess 20 surrounds the associated cooling pipe 12 may also be differently dimensioned. The enclosure angle should be larger than 180 degrees and less than 360 degrees and is preferably between about 210 degrees and 300 degrees. The cooling element bodies may have another cross-sectional form than that described and illustrated but their smallest cross-sectional dimension is however preferably greater (for example at least 1.5 times) than the diameter of the associated cooling pipe. The intermediate layer 17 may consist of a fabric or felt of carbon fibres, a paste or another suitable material or can be omitted completely. The cooling element bodies may consist of other adequately refractory materials instead of graphite, for example a ceramic, and the intermediate space 18 between adjacent bodies can also have the form of an inclined or bent gap so that no direct visual connection exists between the heat source generating the heat flow 14 and the wall 10 to be protected. The cooling pipes 12 need not be straight; on the contrary, the invention may also be applied to bent cooling pipes, the recesses 20 then being given a corresponding path or, if the bend is not too pronounced, a plurality of relatively short protective element bodies may be provided in the longitudinal direction of each pipe. The assembly by pushing onto the finished assembled cooling pipes 12 permits implementation of large-area coverings at low cost.

I claim:

1. An actively cooled shield for protecting a wall from a source of heat comprising, in combination:
   a series of parallel equally spaced cooling pipes having a predetermined outside diameter secured to said wall on the surface thereof facing the source of heat and adapted for connection to a coolant system, and
   a plurality of protective element bodies associated with and removably supported on said cooling pipes, each formed of a heat-resistant material and having side edges, top and bottom edges, a front surface which faces the source of heat and a back surface which is parallel to the front surface, and a width substantially equal to said spacing between said cooling pipes, and having formed in its back surface a generally cylindrical recess having a diameter larger than the outside diameter of said cooling pipes which extends between its top and bottom edges, equidistant from its side edges, in which a cooling pipe is received with sliding fit, the center axis of said recess being spaced inwardly from said back surface a distance selected to cause the interior cylindrical portion of the recess to engage an arcuate portion of the exterior surface of a respective cooling pipe throughout an angular range from about 210° to about 300°.

2. A heat protective shield according to claim 1, wherein said wall is vertically oriented and said cooling pipes are positioned vertically, and wherein said protective element bodies are radially connected to associated pipes exclusively by the engagement of said cylindrical recess and the lower edge of each is force locked to the upper edge of the element body disposed immediately below it.

3. A heat protective shield according to claim 1, wherein the interior cylindrical portion of the recess engages an arcuate portion of the exterior surface of the associated cooling pipe throughout an angular range of about 270°.

4. A heat protective shield according to claim 1, wherein said cooling pipes are brazed or welded to said wall.

5. A heat protective shield according to claim 1, wherein the spacing of adjacent cooling pipes and the dimensions of said protective element bodies are so related as to provide an intermediate space between protective element bodies arranged on adjacent cooling pipes.

6. A heat protective shield according to claim 1, wherein a plurality of protective element bodies each of which is relatively short compared with the length of the associated cooling pipe, are supported on each cooling pipe.

7. A heat protective shield according to claim 6, wherein said protective element bodies are approximately square in plan view.

8. A heat protective shield according to claim 1, wherein the protective element bodies consist of graphite.

9. A heat protective shield according to claim 1, wherein the protective element bodies consist of ceramic material.

* * * * *